United States Patent
Srivastava et al.

(10) Patent No.: US 11,907,171 B2
(45) Date of Patent: Feb. 20, 2024

(54) DYNAMIC INTELLIGENT LOG ANALYSIS TOOL

(71) Applicant: SAP SE, Walldorf (DE)

(72) Inventors: Anviti Srivastava, Ghaziabad (IN); Nirjar Gandhi, New Delhi (IN); Akash Gupta, Agra (IN); Sudhir Verma, Gurgaon (IN); Divyanshu Bajpai, Raebareli (IN)

(73) Assignee: SAP SE, Walldorf (DE)

( * ) Notice: Subject to any disclaimer, the term of this patent is extended or adjusted under 35 U.S.C. 154(b) by 202 days.

(21) Appl. No.: 17/514,362

(22) Filed: Oct. 29, 2021

(65) Prior Publication Data

US 2023/0135368 A1 May 4, 2023

(51) Int. Cl.
*G06F 16/00* (2019.01)
*G06F 16/18* (2019.01)

(52) U.S. Cl.
CPC ................ *G06F 16/1805* (2019.01)

(58) Field of Classification Search
CPC ................................. G06F 16/1805
See application file for complete search history.

(56) References Cited

U.S. PATENT DOCUMENTS 9,798,607 B1 * 10/2017 Kulkarni ............. G06F 11/0778
10,805,327 B1 10/2020 Grilli
2016/0013999 A1 * 1/2016 Bond ..................... H04L 67/535
    709/224
2021/0240691 A1 8/2021 Bertoni Scarton et al.
2021/0303440 A1 * 9/2021 Rodgers ................ G06F 11/364
2022/0121709 A1 * 4/2022 Lehmann ............ G06F 11/3476

FOREIGN PATENT DOCUMENTS

EP    4105813 A1 * 12/2022

OTHER PUBLICATIONS

"European Application Serial No. 22202054.7, Extended European Search Report dated Apr. 4, 2023", 8 pgs.

(Continued)

*Primary Examiner* — Tony Mahmoudi
*Assistant Examiner* — Suman Rajaputra
(74) *Attorney, Agent, or Firm* — SCHWEGMAN LUNDBERG & WOESSNER, P.A.

(57) ABSTRACT

Techniques for implementing a dynamic intelligent log analysis tool are disclosed. In some embodiments, a computer system performs operations comprising: obtaining a log file comprising a plurality of log entries, each log entry comprising an error message; identifying a set of unique words from the error messages; for each error message, computing a term-frequency vector based on a frequency of occurrence for each unique word of the set of unique words in the error message; for each error message, computing a similarity measure between the term-frequency vectors of the error message and every other error message of the log entries; for each error message, computing a score based on a sum of the similarity measures; and displaying an indication of one or more of the error messages on a computing device based on the scores for the one or more of the error messages.

20 Claims, 15 Drawing Sheets

(56) References Cited

OTHER PUBLICATIONS

"European Economic Area", Wikipedia, [Online]. Retrieved from the Internet: <URL: https://en.wikipedia.org/wiki/European_Economic_Area>, (Accessed Apr. 5, 2023), 19 pgs.
"European Union", Wikipedia, [Online]. Retrieved from the Internet: <URL: https://en.wikipedia.org/wiki/European_Union>, (Accessed Apr. 5, 2023), 33 pgs.
"European Union Law", Wikipedia, [Online]. Retrieved from the Internet: <URL: https://en.wikipedia.org/wiki/EU_law>, (Accessed Apr. 5, 2023), 60 pgs.
"Information Privacy (Redirected from Data protection)", Wikipedia, [Online]. Retrieved from the Internet: <URL: https://en.wikipedia.org/wiki/Data_protection>, (Accessed Apr. 5, 2023), 12 pgs.
"Personal Data", Wikipedia, [Online]. Retrieved from the Internet: <URL: https://en.wikipedia.org/wiki/Personal_data>, (Accessed Apr. 5, 2023), 12 pgs.
"Regulation (European Union)", Wikipedia, [Online]. Retrieved from the Internet: <URL: https://en.wikipedia.org/wiki/Regulation_(European_Union)>, (Accessed Apr. 5, 2023), 3 pgs.
Han, Jiawei, et al., "Chapter 2: Getting to Know Your Data", Data Mining—Concepts and Techniques (The Morgan Kaufmann Series in Data Management Systems, Third Edition), (2012), 39-82.

* cited by examiner

```
#2.0BS#2021 01 22 09:05:11:927#+-0100#Debug#com.sap.engine.service.security.authentication.callbackhandler#
#BC-JAS-SEC#security#C000AC#sap.comxapps~xmil~ear#com.sap.engine.services.security.authentication.callbackhandler#
Set password in login#

#2.0BS#2021 01 22 09:05:13:927#+-0100#Debug#com.sap.engine.service.security.authentication.callbackhandler#
#BC-JAS-SEC#security#C000AC#sap.comxapps~xmil~ear#com.sap.engine.services.security.authentication.callbackhandler#
Password does not match with admin password#

#2.0BS#2021 01 22 09:05:15:927#+-0100#Debug#com.sap.engine.service.security.authentication.callbackhandler#
#BC-JAS-SEC#security#C000AC#sap.comxapps~xmil~ear#com.sap.engine.services.security.authentication.callbackhandler#
Set password in login#
```

*FIG. 3*

0: "\r"
1: "\r"
2: "#2.0b#2021 01 22 09:05:11:927#+0100#Debug#com.sap.engine.service.security.authentication.callbackhandler#\r"
3: "#BC-JAS-SEC#security#C000AC#sap.comxapps~xmil~ear#com.sap.engine.services.security.authentication.callbackhandler"
4: "Set password in login#\r"
5: "\r"
6: "#2.0b#2021 01 22 09:05:13:927#+0100#Debug#com.sap.engine.service.security.authentication.callbackhandler#\r"
7: "#BC-JAS-SEC#security#C000AC#sap.comxapps~xmil~ear#com.sap.engine.services.security.authentication.callbackhandler"
8: "Password does not match with admin password#\r"
9: "\r"
10: "#2.0BS#2021 01 22 09:05:15:927#+0100#Debug#com.sap.engine.service.security.authentication.callbackhandler#\r"
11: "#BC-JAS-SEC#security#C000AC#sap.comxapps~xmil~ear#com.sap.engine.services.security.authentication.callbackhandler"
12: "Set password in login#\r"
13: "\r"
14: " "

```
▽ 0:
    Component: "BC-JAS-SEC"          ◂— 510
    Date: "2021 01 22 09:05:11:927"
    DateExcTime: "2021 01 22"
    DateSortTime: "20210122"
    Error: "set password in login \r"
    NonGrpError: "set password in login#\r"
    Severity: "Debug"
  ▷ Thread: {Name: "HTTP Worker [@323430275]", Num: "5", Type: "Dedicated_App"}
    User: "Guest"
  ▷ _proto_: Object ▽ 1:
    Component: "BC-JAS-SEC"          ◂— 520
    Date: "2021 01 22 09:05:13:927"
    DateExcTime: "2021 01 22"
    DateSortTime: "20210122"
    Error: "password does not match with admin password \r"
    NonGrpError: "password does not match with admin password#\r"
    Severity: "Debug"
  ▷ Thread: {Name: "HTTP Worker [@323430275]", Num: "5", Type: "Dedicated_App"}
    User: "Guest"
  ▷ _proto_: Object ▽ 2:
    Component: "BC-JAS-SEC"          ◂— 530
    Date: "2021 01 22 09:05:15:927"
    DateExcTime: "2021 01 22"
    DateSortTime: "20210122"
    Error: "set password in login \r"
    NonGrpError: "set password in login#\r"
    Severity: "Debug"
  ▷ Thread: {Name: "HTTP Worker [@323430275]", Num: "5", Type: "Dedicated_App"}
    User: "Guest"
```

*FIG. 5*

```
▽ 0:
    ▽ Combine: Array(2)                                          ←—610
        ▷ 0: {Date: "22-01-2021 09:05:11:927", Error: "set password in login#}
        ▷ 1: {Date: "22-01-2021 09:05:15:927", Error: "set password in login#}
          length: 2
        ▷ _proto_: Array(0)
       Component: "BC-JAS-SEC"
       CosineScore: NaN
       Count: 2
       Error: "set password in login \r"
       Final Rank: 1
       Final_Score: NaN
       visible: true
    ▷ _proto_: Object ▽ 1:
    ▷ Combine: [ {...} ]                    ←—620
      Component: "BC-JAS-SEC"
      CosineScore: NaN
      Count: 1
      Error: "password does not match with admin password \r"
      Final Rank: 2
      Final_Score: NaN
      visible: true
```

FIG. 6

| DATE-TIME | LOG DETAILS | STACK TRACE |
|---|---|---|
| 07-04-2020 05:30:46:133 | JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE | ▶ |
| 07-04-2020 05:30:46:133 | JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE | ▶ |
| 07-04-2020 05:30:46:133 | JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE | ▶ |
| 07-04-2020 05:30:46:133 | JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE | ▶ |

FIG. 11

STACK TRACE

JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE
AT
COM.SAP.ENGINE.SERVICES.WEBSERVICES.ESPBASE.CLIENT.JAXWS.CORE.WSINVOCATIONHANDLER.PROCESSTRANSPORTBINDINGCALL(WSINVOCATIONHANDLER.JAVA74)
AT
COM.SAP.ENGINE.SERVICES.WEBSERVICES.ESPBASE.CLIENT.JAXWS.CORE.WSINVOCATIONHANDLER.INVOKESEISYNCMETHOD(WSINVOCATIONHANDLER.JAVA:12
AT
COM.SAP.ENGINE.SERVICES.WEBSERVICES.ESPBASE.CLIENT.JAXWS.CORE.WSINVOCATIONHANDLER.INVOKESEISYNCMETHOD(WSINVOCATIONHANDLER.JAVA:84
AT
COM.SAP.ENGINE.SERVICES.WEBSERVICES.ESPBASE.CLIENT.JAXWS.CORE.WSINVOCATIONHANDLER.INVOKE(WSINVOCATIONHANDLER.JAVA.65)
AT COM.SUN.PROXY.$PROXY1242.MTGETTIDBYNAME(UNKNOWN SOURCE)
AT
COM.SAP.MONITORING.WS.CONTROLLERS.CCMCCALLCONTROLLER.GETTIDSBYNAME(CCMSCALLCONTROLLER.JAVA:74)

*FIG. 12*

DYNAMIC INTELLIGENT LOG ANALYSIS TOOL

BACKGROUND

Log analysis is the process of reviewing and understanding log files, which allows organizations to obtain useful insights and knowledge regarding the functionality of software operations. Organizations use these insights in their maintenance processes to troubleshoot software problems. However, log files are complex and take an enormous amount of time to analyze. When multiple log files need to be analyzed, the complexity and strain on resources is compounded.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 3 illustrates example data of a log file in raw form.

FIG. 4 illustrates example data of a log file in semi-structured form.

FIG. 5 illustrates example data extracted from a log file.

FIG. 6 illustrates an example of data extracted from a log file being grouped together.

FIG. 11 illustrates an example GUI in which log details of a log entry are displayed.

FIG. 12 illustrates an example GUI in which a stack trace is displayed.

DETAILED DESCRIPTION

Figure 1:
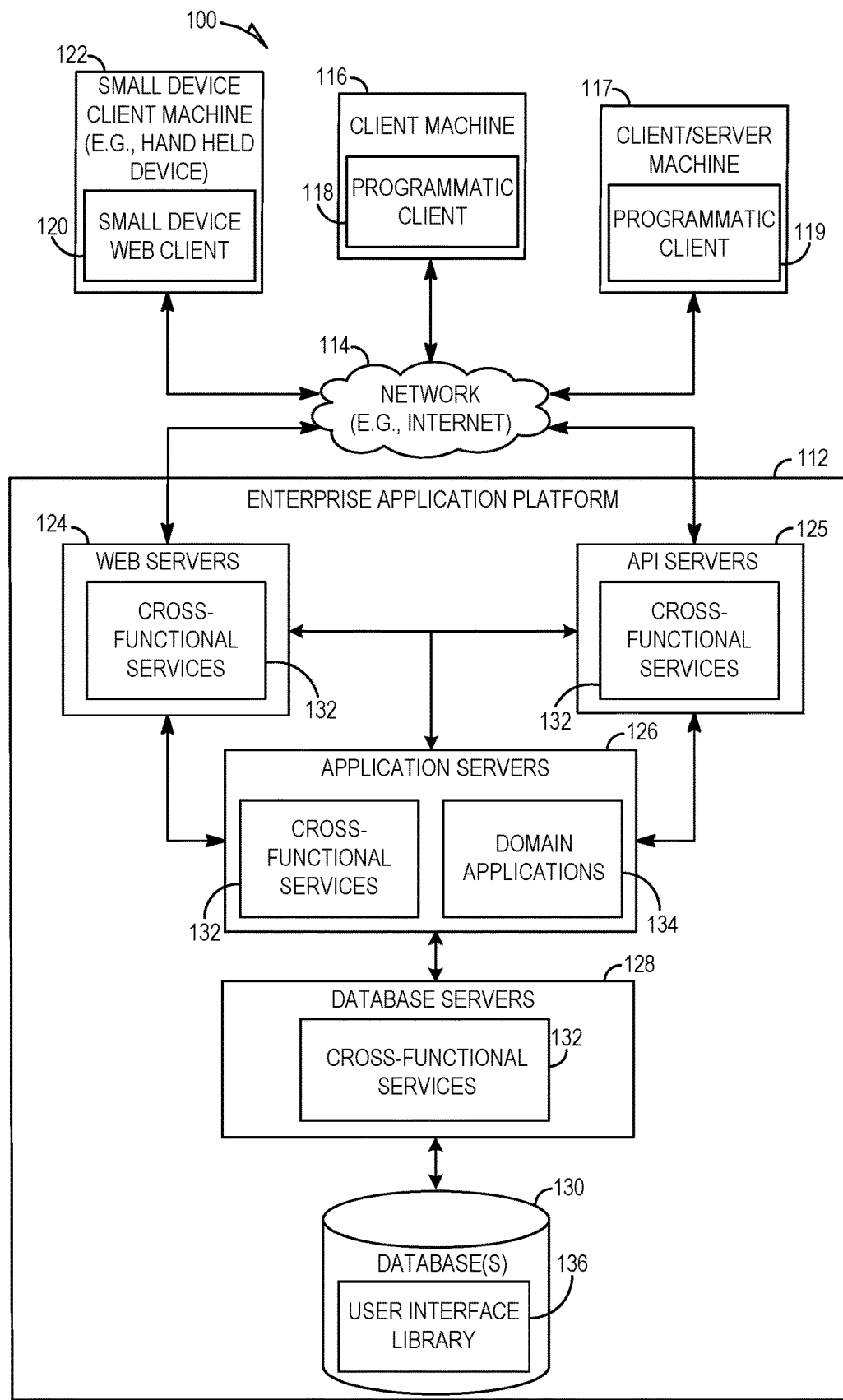
FIG. 1 is an example network diagram illustrating a system.

Example methods and systems for implementing a dynamic intelligent log analysis tool are disclosed. In the following description, for purposes of explanation, numerous specific details are set forth in order to provide a thorough understanding of example embodiments. It will be evident, however, to one skilled in the art that the present embodiments can be practiced without these specific details.

Current log management tools are centrally hosted on a server, thereby requiring users to transfer the log files to the server via network calls in order for log analysis to begin. As a result, current log management tools are a drain on electronic resources, such as network bandwidth. Furthermore, the log analysis process is slowed down due to this reliance on communication with the server, since connectivity problems and the large size of the log files cause delays in the transmission and processing of the data in the log files. Additionally, the transmission of log files to a server raises data protection and privacy problems due to the resulting exposure of the data of the log files. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to implement a dynamic intelligent log analysis tool. The log analysis tool analyzes data from the log files and may identify and highlight anomalous or rarer log entries that describe a probable root cause of a software-related malfunction. Additionally, the log analysis tool may be implemented on the client-side rather than on the server-side, thereby removing the reliance on network calls and transferring of huge files of private data. As a result, the log analysis tool of the present disclosure improves the effectiveness, efficiency, and data security of computer-based log analysis.

In some example embodiments, the computer system obtains a log file comprising a plurality of log entries, with each log entry in the plurality of log entries comprising a corresponding error message, and identifies a set of unique words from the error messages of the plurality of log entries. For each error message in the error messages of the plurality of log entries, the computer system may compute a corresponding term-frequency vector based on a corresponding frequency of occurrence for each unique word of the set of unique words in the error message, compute a corresponding similarity measure between the error message and every other error message of the plurality of log entries, and compute a corresponding score based on a sum of the corresponding similarity measures between the error message and every other error message of the plurality of log entries. The computer system may then display an indication of one or more of the error messages of the plurality of log entries on a computing device based on the corresponding scores for the one or more of the error messages of the plurality of log entries. In some example embodiments, the computer system comprises a client-side software tool running on the computing device.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
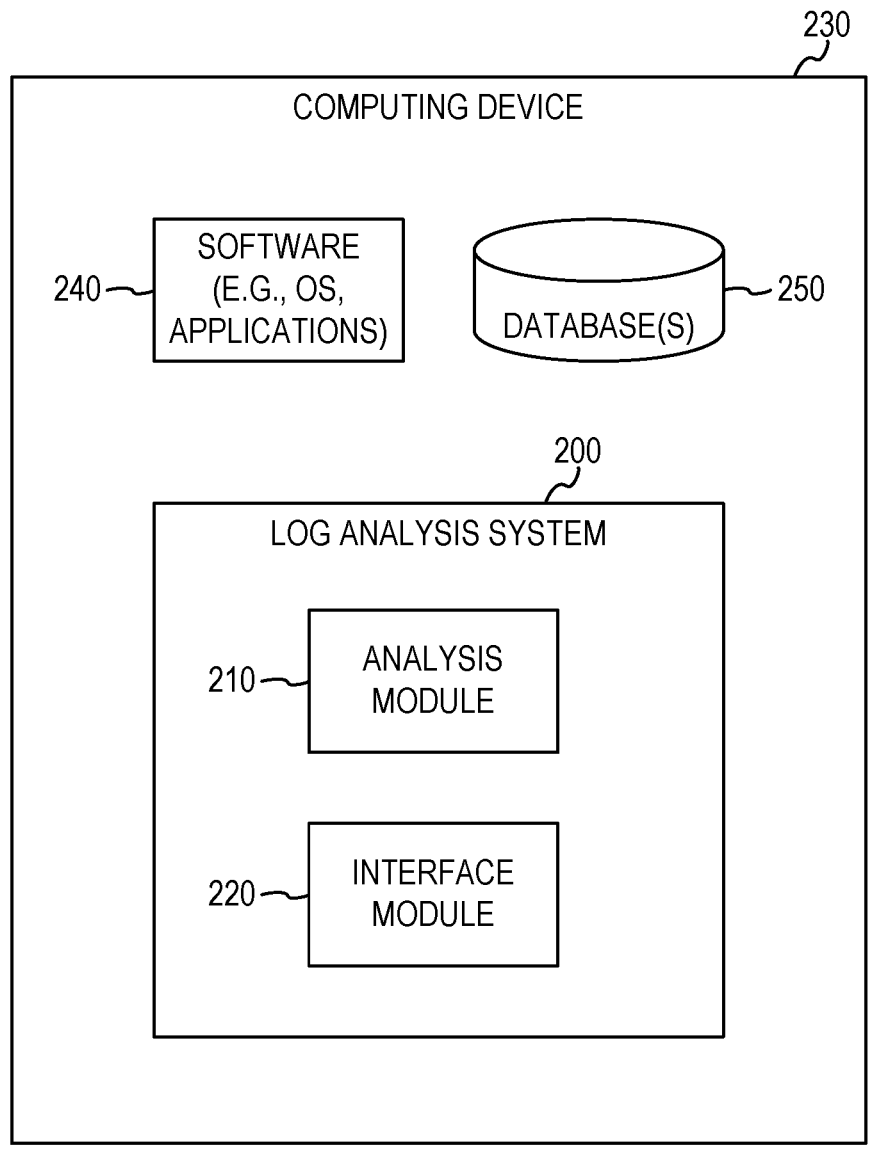
FIG. 2 is a block diagram illustrating an example log analysis system.

FIG. 2 is a block diagram illustrating a log analysis system 200. In some embodiments, the log analysis system 200 comprises an analysis module 210 and an interface module 220. The analysis module 210 and the interface module 220 can reside on a computer system, or other machine, having a memory and at least one processor (not shown), such as a computing device 230. The computing device 230 may comprise any of the machines 116, 117, or 122 of FIG. 1. However, other types of computing devices are also within the scope of the present disclosure.

In some example embodiments, one or more of the analysis module 210 and the interface module 220 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input. In some example embodiments, one or more of the analysis module 210 and the interface module 220 are configured to receive user input. For example, one or more of the analysis module 210 and the interface module 220 can present one or more graphical user interface (GUI) elements (e.g., drop-down menu, selectable buttons, text field) with which a user can submit input. In some example embodiments, one or more of the analysis module 210 and the interface module 220 are configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the analysis module 200 is configured to obtain one or more log files, with each log file comprising a plurality of log entries. For example, the interface module 220 may display one or more user interface elements that the user may interact with to upload the log file(s), such as a field for entering a file name, a selectable element for browsing files to select for upload, and a selectable element for triggering an upload of any files selected by the user to the analysis module. Once the files are uploaded the user can also choose to select/deselect certain files which he may not need to be analyzed in current analysis cycle. A log file is a file that records events that occur in an operating system or other software runs.

Each log entry of the log file may comprise a date and time of log activity occurrence, a severity of the log activity, a component or module where the log activity occurred, user information identifying a user associated with the log activity (e.g., a user who was using the computing device during the log activity occurrence), a thread identification of the processing thread where the log activity occurred, a message indicating the nature or type of log activity, and a stack trace, as well as other data. In some example embodiments, the message comprises an error message that includes a brief description about the log activity.

In some example embodiments, the log analysis system 200 may comprise a client-side software tool running on the computing device 230. The computing device 230 may comprise the small device client machine 122, the client machine 116, or the client/server machine 117 of FIG. 1. However, other implementations of the computing device 230 are also within the scope of the present disclosure. The computing device 230 may comprise software 240 and one or more databases 250. The software 240 may comprise an operating system. The software 240 may additionally or alternatively comprise one or more software applications. The software 240 may generate the log files and store them in the database(s) 250, and the user may upload the log files from the database(s) 250 to the analysis module 210.

The log files may comprise large text of log data in raw format. Therefore, before analyzing a log file, the analysis module 210 may convert the data of the log file into structured form to make it useful for analysis. In some example embodiments, the analysis module 210 performs data wrangling on the log file. Data wrangling is a process of structuring, cleaning, and enriching raw data of one form to another format with an aim to make it more suitable and appropriate for the purpose of analysis and processing. FIG. 3 illustrates example data of a log file 300 in raw form. In FIG. 3, the log file includes a plurality of log entries 310 in raw form.

In some example embodiments, the analysis module 210 is configured to split the raw data of the log file into single line log entries using delimiters that specify the boundaries between separate, independent regions of the raw data. FIG. 4 illustrates example data 400 of a log file in semi-structured form. In FIG. 4, the raw data of the log file 300 in FIG. 3 has been converted by the analysis module 210 into the data 400, which comprises single line log entries. This conversion of the raw data into single line entries in semi-structured form prepares the data for further processing by the analysis module 210.

Next, the analysis module 210 may divide the semi-structured data 500 into tokens to enable accurate analysis on the log file. In natural language processing, tokenization refers to breaking text into sentences and words. In some example embodiments, tokenization is performed by the analysis module 210 to extract various information from the log entries regarding details of the log entries, such as a date and time of log activity occurrence, a severity of the log activity, a component or module where the log activity occurred, user information identifying a user associated with the log activity, a thread identification of the processing thread where the log activity occurred, and a message indicating the nature or type of log activity. By applying suitable delimitators, the analysis module 210 ensures that segments of each log entry are carefully inserted in appropriate fields to form semi-structured data. FIG. 5 illustrates example data 510, 520, and 530 extracted from a log file. In FIG. 5, the data 510, 520, and 530 has been extracted from the single line log entries of the data 400 of FIG. 4. As seen in FIG. 5, the analysis module 210 may extract error messages from the data 400 and remove any numbers or special characters from the error messages that may not be useful in natural language processing. For example, in FIG. 5, the analysis module 210 has extracted the error message "set password in login #\r" and stored this raw form of the error message in one field (e.g., in the field labeled "Non-GrpError" in FIG. 5), as well as storing an edited version of the error message in another field (e.g., in the field labeled "Error" in FIG. 5). The edited version in FIG. 5 reads "set password in login \r" and was generated by the analysis module 210 by removing the "#" character from the raw form of the error message.

In some example embodiments, the analysis module 210 is configured to filter out data from the extracted data based on one or more filter criteria specified by the user. For example, the analysis module 210 may filter out any log entries that do not satisfy the user-specified filter criteria. Examples of filter criteria include, but are not limited to, a user-specified component from which the corresponding error message of the log entry originated, a user-specified date range within which the log entry was recorded in the log file, a user-specified time range within which the log entry was recorded in the log file, one or more users-specified keywords included in the log entry, a user-specified severity level, a user-specified thread that was used to perform a task when the log entry was recorded in the log file, and a user-specified identification of another user included in the log entry. Other types of filter criteria are also within the scope of the present disclosure.

Each log file may contain thousands of log entries that are often the same except or having occurred at different time periods. In some example embodiments, in order to make the analysis of the log entries faster and more efficient, the analysis module 210 may group all similar semi-structured log entries together. For example, the analysis module 210 may group all log entries having the same error together. FIG. 6 illustrates an example of data extracted from a log file being grouped together. In FIG. 6, the analysis module 210 has grouped together the data 510 and 530 from FIG. 5 into a group 610 based on the log entries of the data 510 and 530 having the same error "set password in login \r" and has put the data 520 from FIG. 5 in a group 620, with the group 610 having two entries and the group 620 having only a single entry.

In some example embodiments, after dividing the log entries into groups as discussed above, the analysis module 210 identifies a set of unique words from the groups of log entries. The analysis module 210 may identify the set of words from the error messages of the groups of log entries. In one example, the following table comprises the error messages from which the set of words is identified.

| | |
|---|---|
| Error 1 | Set password in login |
| Error 2 | Password does not match with admin password |

The analysis module 210 may generate a set of all unique words from the error messages of the log entries using a bag-of-words model on the error fields of the grouped plurality of log entries. A bag-of-words model is a simplifying representation in which a text is represented as the multiset of its words, disregarding grammar and even word order, but keeping multiplicity.

In some example embodiments, the analysis module 210 is configured to, for each error message in the error messages of the plurality of log entries, compute a corresponding term-frequency vector based on a corresponding frequency of occurrence for each unique word of the set of unique words in the error message. For the example error messages "Error 1" and "Error 2" in the table above, the following term-frequency table is shown below for each error message:

| | set | password | in | login | does | not | match | with | admin |
|---|---|---|---|---|---|---|---|---|---|
| Error 1 | 1 | 1 | 1 | 1 | 0 | 0 | 0 | 0 | 0 |
| Error 2 | 0 | 2 | 0 | 0 | 1 | 1 | 1 | 1 | 1 |

Using the example term-frequency table above, the analysis module 310 may generate the following term-frequency vectors for the error messages:

Error 1: [1, 1, 1, 1, 0, 0, 0, 0, 0]

Error 2: [0, 2, 0, 0, 1, 1, 1, 1, 1]

In some example embodiments, the analysis module 210 is configured to, for each error message in the error messages of the plurality of log entries, compute a corresponding similarity measure between the term-frequency vectors of the error message and every other error message of the plurality of log entries. For example, the analysis module 210 may compute a corresponding cosine similarity between the term-frequency vectors of the error message and every other error message of the plurality of log entries. A cosine similarity is a measure of similarity between two non-zero vectors of an inner product space, and it is defined to equal the cosine of the angle between them, which is also the same as the inner product of the same vectors normalized to both have length 1. Other similarity measures are also within the scope of the present disclosure.

In some example embodiments, the analysis module 210 is configured to, for each error message in the error messages of the plurality of log entries, compute a corresponding score based on a sum of the corresponding similarity measures between the term-frequency vectors of the error message and every other error message of the plurality of log entries. For example, in a scenario where there are five error messages M1, M2, M3, M4, and M5, and $S_{xy}$ represents the similarity measure between the term-frequency vectors of error message x and error message y, the sum of the corresponding similarity measures between the term-frequency vectors of error message M1 and every other error message is represented as follows:

$$Sum = S_{M1M2} + S_{M1M3} + S_{M1M4} + S_{M1M5}.$$

Figure 7:
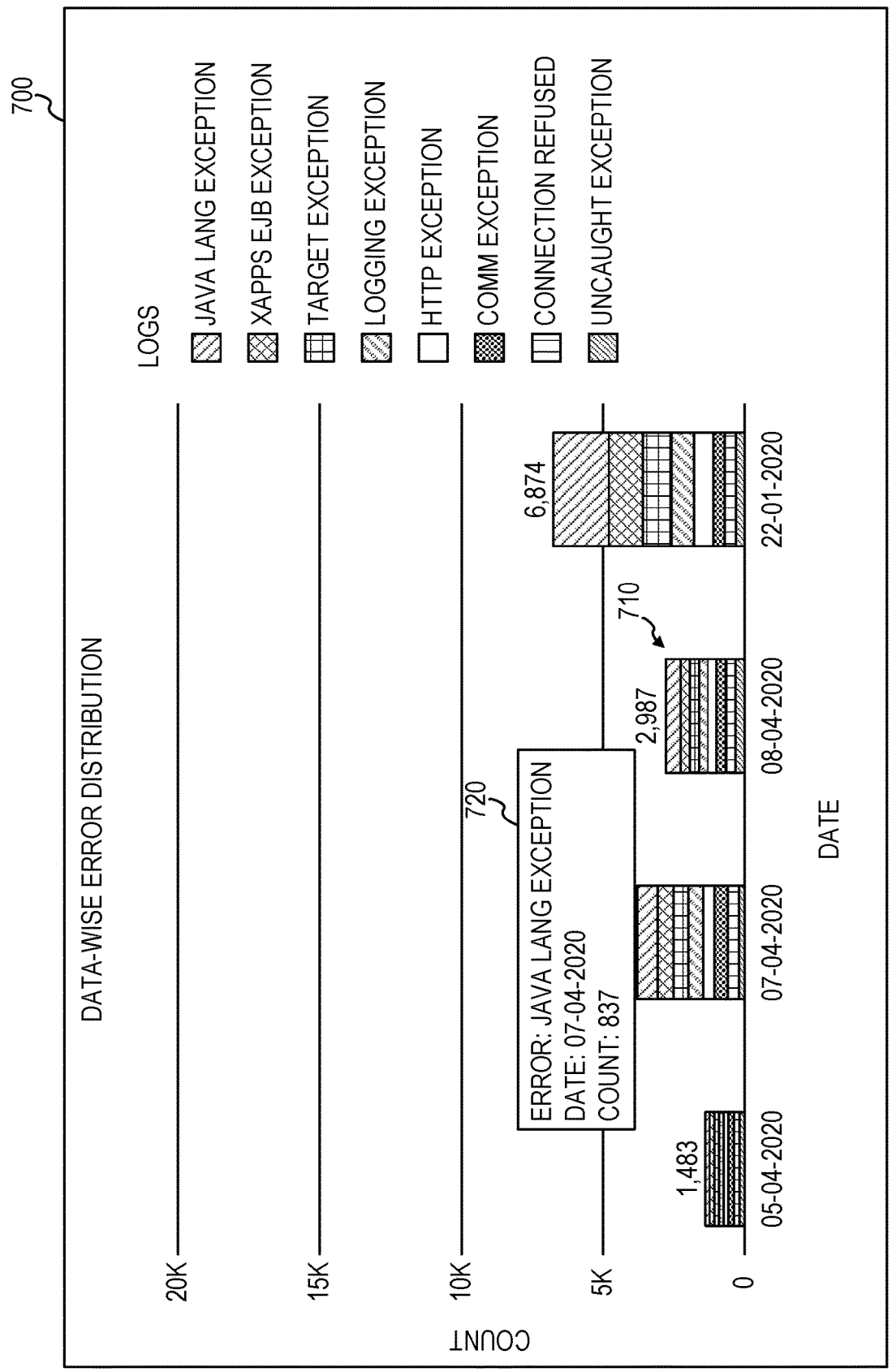
FIG. 7 illustrates an example graphical user interface (GUI) in which a frequency distribution of error messages is displayed.

The interface module 220 may be configured to display a visualization of the log entries, including analytic data regarding the log entries. For example, the interface module 220 may display a frequency distribution of the error messages of the log entries in order to provide the user with insight as to the frequency at which each error is occurring. FIG. 7 illustrates an example graphical user interface (GUI) 700 in which a frequency distribution of error messages is displayed. In FIG. 7, the GUI 700 includes a chart in which a corresponding count 710 of occurrences of each type of error is plotted along an X-axis of dates. In the example shown in FIG. 7, a stack 710 of slices representing the different errors that occurred is displayed for each date of occurrence. Each slice of the stack 710 may be configured to, in response to its selection, trigger a display of a user interface element 720 that includes details about the corresponding error of the selected slice, such as the type of error, the date on which the error occurred, and the number of times the error occurred on that date.

Figure 8:
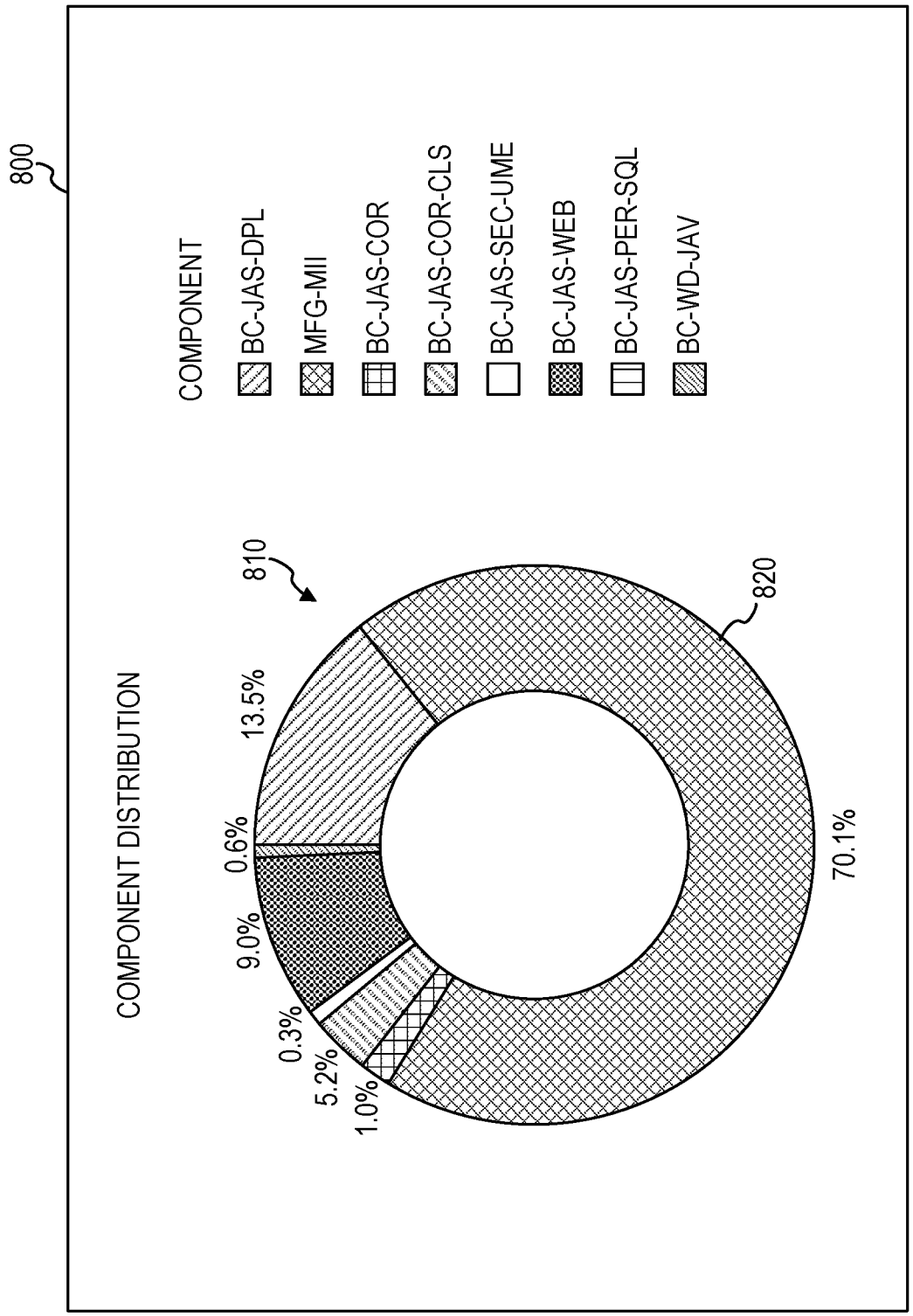
FIG. 8 illustrates an example GUI in which a distribution of the plurality of log entries by components present in the plurality of log entries is displayed.

In some example embodiments, the interface module 220 is configured to display a distribution of log entries by components that are present in the log entries. FIG. 8 illustrates an example GUI 800 in which a distribution 810 of the plurality of log entries by components present in the plurality of log entries is displayed. In FIG. 8, the distribution 810 is displayed as a pie chart in which slices 820 of the pie chart correspond to the portion of the log entries that are attributable to a particular component. The distribution 810 of the plurality of log entries may be organized by other entities as well, such as by users present in the plurality of log entries.

Figure 9:
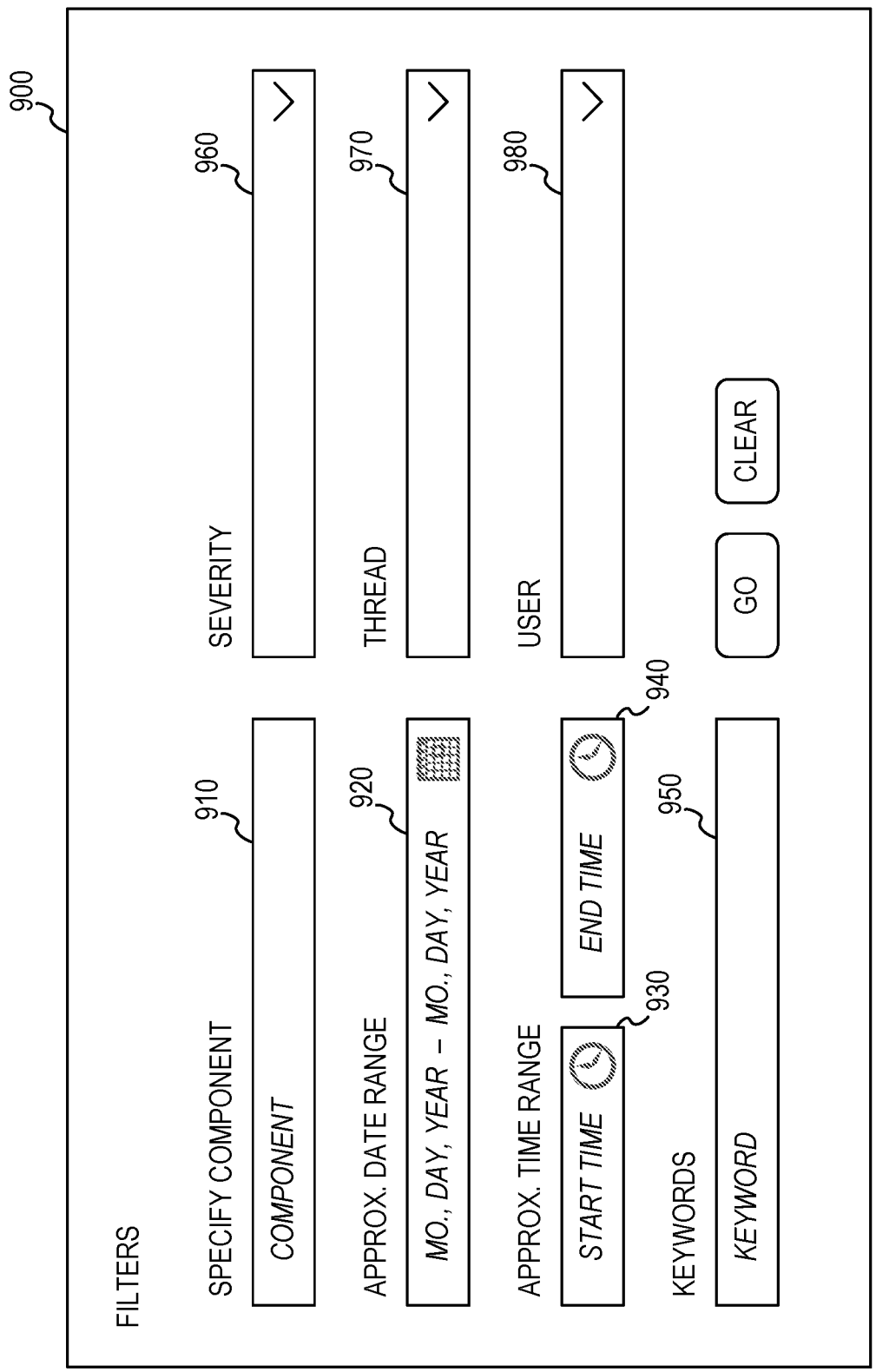
FIG. 9 illustrates an example GUI in which filter criteria may be input by a user is displayed.

In some example embodiments, the interface module 220 is configured to display a GUI in which a user may input one or more filter criteria for use in analyzing the log entries. FIG. 9 illustrates an example GUI 900 in which filter criteria may be input by a user is displayed. For example, the GUI 900 may include a field 910 in which the user may specify one or more components, a field 920 in which the user may specify a date range, field 930 and 940 in which the user may specify a time range (e.g., a start time and an end time), a field 950 in which the user may specific one or more keywords, a field 960 in which the user may specify a severity, a field 970 in which the user may specify one or more threads, and a field 980 in which the user may specify one or more users.

Figure 10:
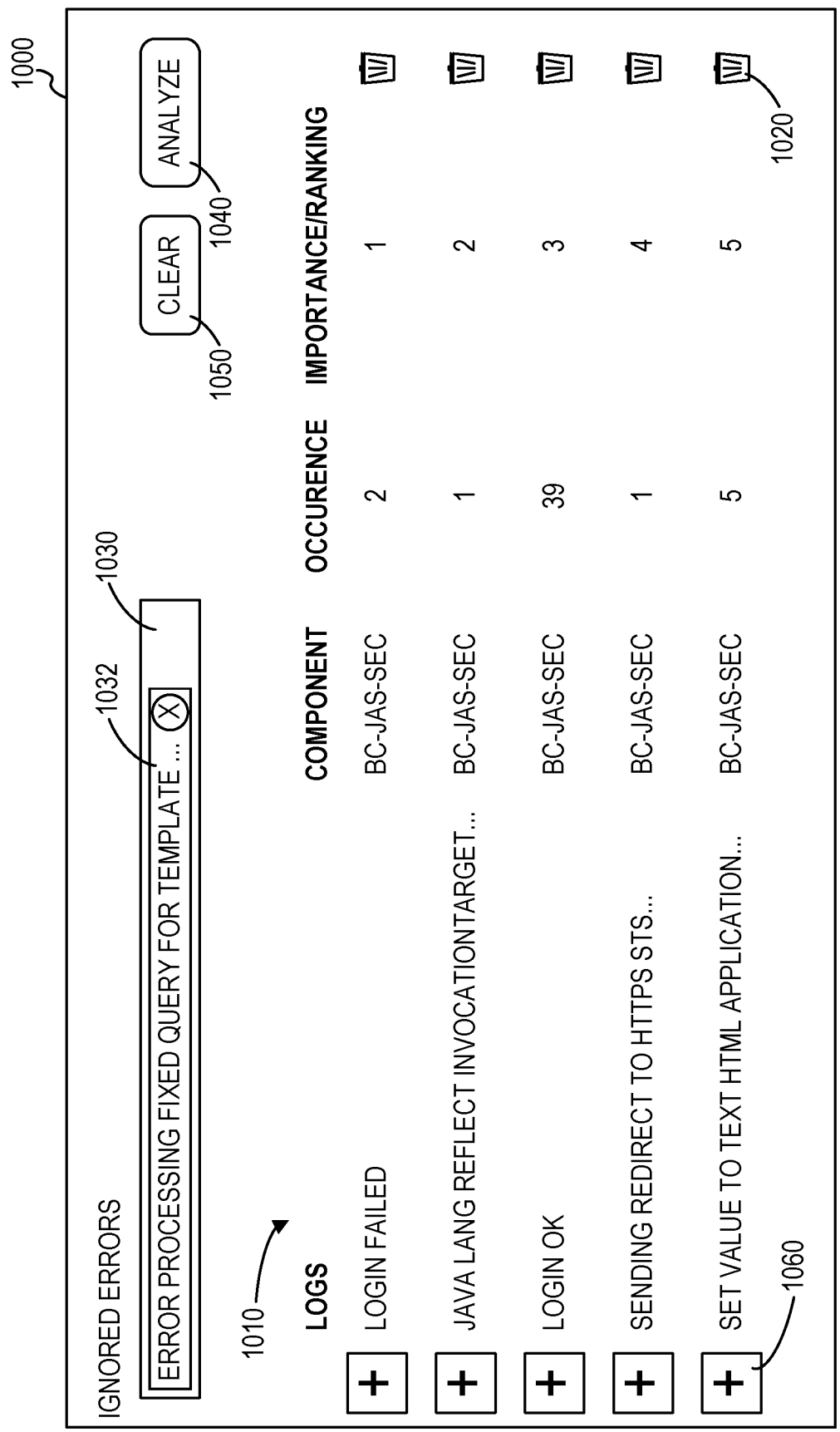
FIG. 10 illustrates an example GUI in which a ranked list of log entries is displayed.

In some example embodiments, the interface module 210 is configured to display an indication of one or more of the error messages of the plurality of log entries on a computing device based on the corresponding scores for the one or more of the error messages of the plurality of log entries. The interface module 210 may rank the error messages of the plurality of log entries based on their corresponding scores, and then display the indication of the one or more of the error messages of the plurality of log entries based on the ranking. FIG. 10 illustrates an example GUI 1000 in which a ranked list 1010 of log entries is displayed. The interface module 220 may rank the error messages in inverse relationship to their scores, such that the lower the score of an error message, the higher the ranking of the error message, and the higher the score of an error message, the lower the ranking of the error message, since a lower score based on similarity represents a greater probability that the error message is anomalous. The interface module 220 may then display the indications of the error messages in descending order of their ranking (e.g., the highest ranking and most anomalous error message being displayed in a topmost position, the second highest ranking error message being displayed in a second position directly under the highest ranking error message, and so on and so forth).

In FIG. 10, the interface module 220 displays a corresponding selectable user interface element 1020 in association with each indication of an error messages in the ranked list 1010. In some example embodiments, in response to the user selecting a selectable user interface element 1020, the analysis module 210 removes the corresponding log entry from the ranked list 1010 and modifies the plurality of log entries to exclude the log entry corresponding to the selected user interface element 1020. The analysis module 210 may then recalculate the term-frequency vectors, similarity measures, and scores using the modified plurality of log entries. An indication of the excluded log entry 1032 may be displayed in a field 1030 of the GUI 1000 in response to the user selecting the corresponding user interface element 1020. If the user wants to recalculate the frequency vectors, similarity measures, and scores without the excluded log entry 1032, then the user may select a user interface element 1040. If the user wants to include the excluded log entry 1032 back into the calculation and analysis, then the user may select a user interface element 1050.

In some example embodiments, the interface module 220 displays a corresponding user interface element 1060 for each indication of an error message in the ranked list 1010. The interface module 220 may be configured to, in response to the user selecting the user interface element 1060, display log details of the log entry corresponding to the selected user interface element 1060. FIG. 11 illustrates an example GUI 1100 in which log details 1120 of a log entry are displayed. The GUI 1100 may also include a corresponding date and time for each instance of log details 1120. Additionally, the interface module 220 may also display a corresponding user interface element 1130 for each instance of log details 1120. The interface module 220 may be configured to, in response to the user selecting the user interface element 1130, display a stack trace of the log entry corresponding to the selected user interface element 1130. FIG. 12 illustrates an example GUI 1200 in which a stack trace is displayed. A stack trace is a report of the active stack frames at a certain point in time during the execution of a program. Stack frames may contain subroutine state information, and each stack frame may correspond to a call to a subroutine.

Figure 13:
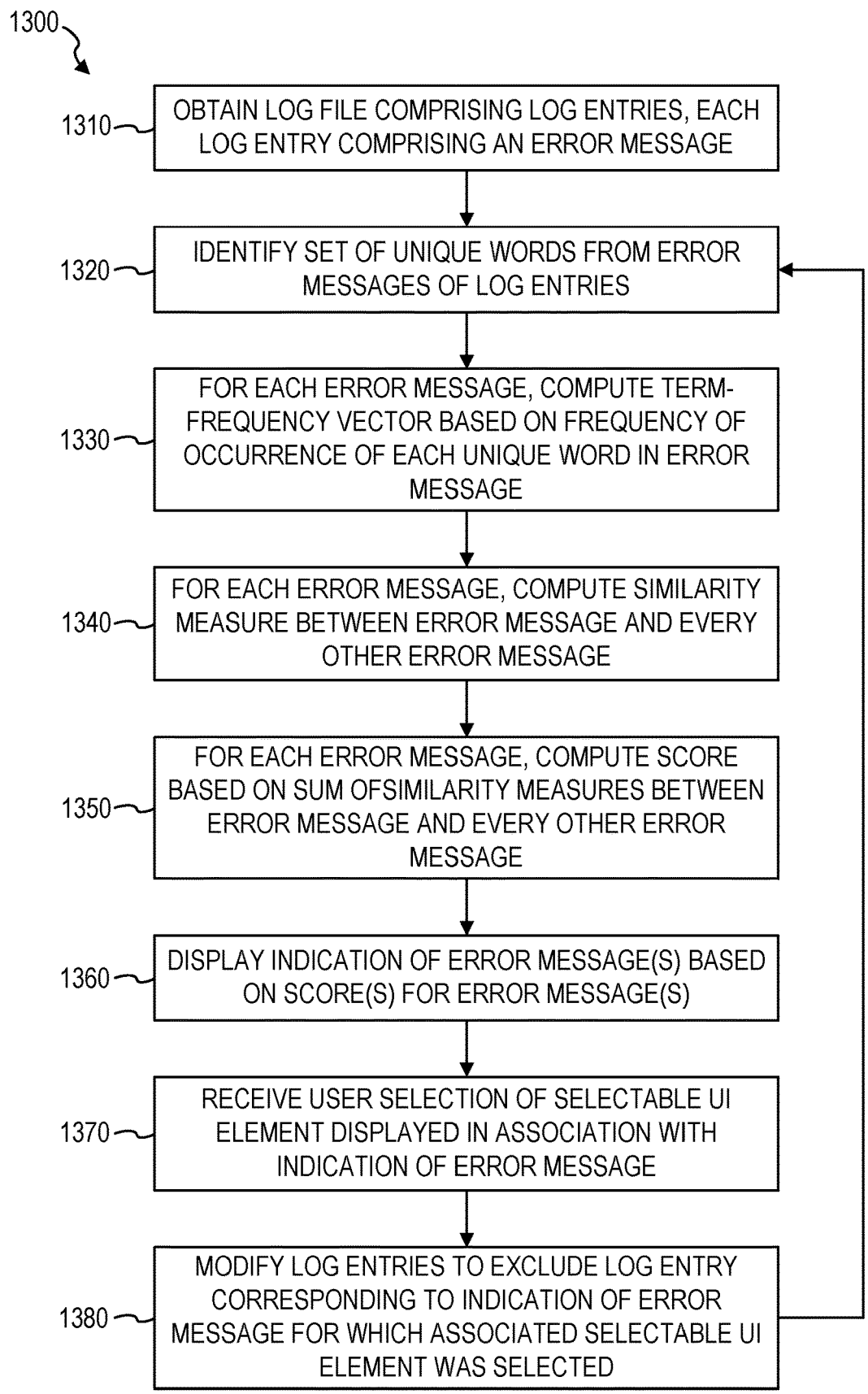
FIG. 13 is a flowchart illustrating an example method of log analysis.

FIG. 13 is a flowchart illustrating an example method 1300 of log analysis. The method 1300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1300 are performed by the log analysis system 200 of FIG. 2 or any combination of one or more of its components (e.g., the analysis module 210, the interface module 220).

At operation 1310, the log analysis system 200 obtains a log file comprising a plurality of log entries. In some example embodiments, each log entry in the plurality of log entries comprises a corresponding error message. The log analysis system 200 may comprise a client-side software tool running on the computing device. However, other implementations (e.g., server-side) of the log analysis system 200 are also within the scope of the present disclosure.

Next, the log analysis system 200 may, at operation 1320, identify a set of unique words from the error messages of the plurality of log entries. In some example embodiment, the identifying the set of unique words from the error messages of the plurality of log entries comprises selecting the plurality of log entries for use in the identifying the set of unique words based on a determination that each log entry in the plurality of log entries satisfies one or more filter criteria input by a user. The one or more filter criteria may comprise one or more of the following criteria: a user-specified component from which the corresponding error message of the log entry originated; a user-specified date range within which the log entry was recorded in the log file; a user-specified time range within which the log entry was recorded in the log file; one or more users-specified keywords included in the log entry; a user-specified severity level; a user-specified thread that was used to perform a task when the log entry was recorded in the log file; or a user-specified identification of another user included in the log entry.

Then, the log analysis system 200, for each error message in the error messages of the plurality of log entries, may compute a corresponding term-frequency vector based on a corresponding frequency of occurrence for each unique word of the set of unique words in the error message, at operation 1330. Each unique word in the set of unique words has a corresponding term-frequency vector that is based on how often the unique word occurs in the error message.

At operation 1340, the log analysis system 200 may, for each error message in the error messages of the plurality of log entries, compute a corresponding similarity measure between the term-frequency vectors of the error message and every other error message of the plurality of log entries. For example, the log analysis system 200 may compute a corresponding cosine similarity between the error message and every other error message of the plurality of log entries. A cosine similarity is a measure of similarity between two non-zero vectors of an inner product space, and it is defined to equal the cosine of the angle between them, which is also the same as the inner product of the same vectors normalized to both have length 1. Other similarity measures are also within the scope of the present disclosure.

The log analysis system 200, for each error message in the error messages of the plurality of log entries, may compute a corresponding score based on a sum of the corresponding similarity measures between the term-frequency vectors of the error message and every other error message of the plurality of log entries, at operation 1350. For example, in a scenario where there are five error messages M1, M2, M3, M4, and M5, and $S_{xy}$ represents the similarity measure between error message x and error message y, the sum of the corresponding similarity measures between error message M1 and every other error message is represented as follows:

$$\text{Sum} = S_{M1M2} + S_{M1M3} + S_{M1M4} + S_{M1M5}.$$

At operation 1360, the log analysis system 200 may then display an indication of one or more of the error messages of the plurality of log entries on a computing device based on the corresponding scores for the one or more of the error messages of the plurality of log entries. In some example embodiments, the log analysis system 200 ranks the error messages of the plurality of log entries based on their corresponding scores, and then displays the indication of the one or more of the error messages of the plurality of log entries based on the ranking. For example, the log analysis system 200 may rank the error messages in inverse relationship to their scores, such that the lower the score of an error message, the higher the ranking of the error message, and the higher the score of an error message, the lower the ranking of the error message, since a lower score based on similarity represents a greater probability that the error message is anomalous. The log analysis system 300 may then display the indications of the error messages in descending order of their ranking (e.g., the highest ranking and most anomalous error message being displayed in a topmost position, the second highest ranking error message being displayed in a second position directly under the highest ranking error message, and so on and so forth).

Then, at operation 1370, the log analysis system 200 may receive, from the computing device, a user selection of a selectable user interface element displayed in association with the corresponding indication of one of the one or more of the error messages of the plurality of log entries. For example, the user may select the corresponding selectable user interface element 620, and then select the selectable user interface element 640, as discussed above with respect to FIG. 6.

Next, the log analysis system 200, in response to the receiving the user selection, may modify the plurality of log entries to exclude the log entry corresponding to the indication of the one of the one or more of the error messages for which the associated selectable user interface element was selected via the user selection, at operation 1380. The method 1300 may then repeat the analysis, returning to operation 1320, where the log analysis system 200 identifies a set of unique words from error messages of the modified plurality of log entries that no longer includes the log entry corresponding to the indication of the one of the one or more of the error messages for which the associated selectable user interface element was selected.

It is contemplated that any of the other features described within the present disclosure can be incorporated into the method 1300.

Figure 14:
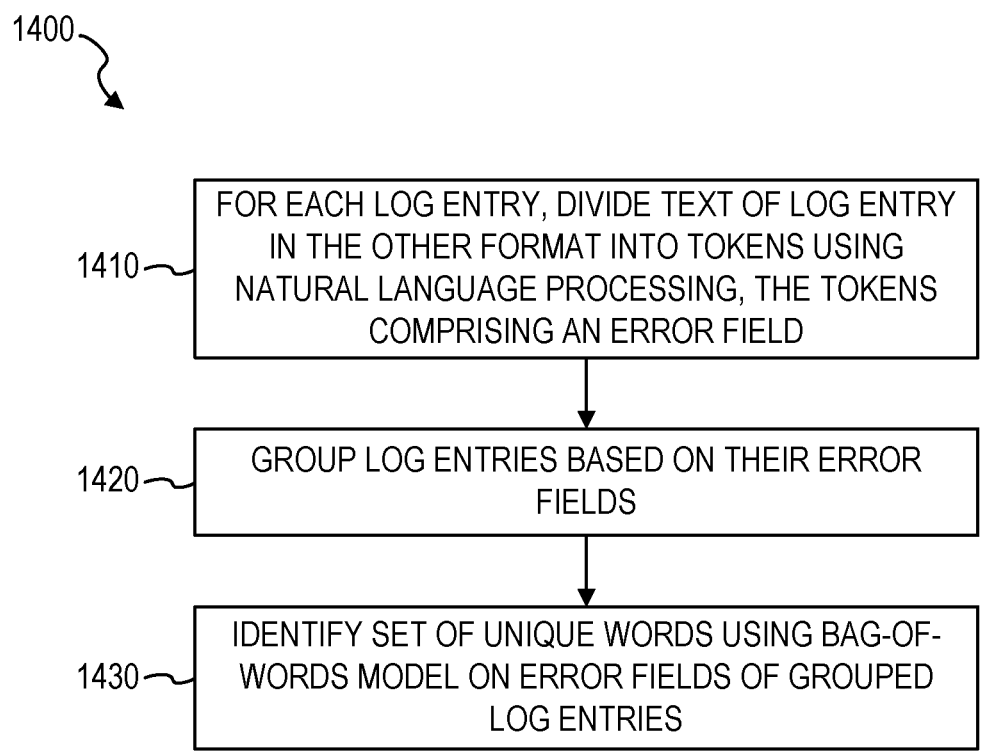
FIG. 14 is a flowchart illustrating an example method of identifying a set of unique words from error messages of log entries.

FIG. 14 is a flowchart illustrating an example method 1400 of identifying a set of unique words from error messages of log entries. The method 1400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1400 are performed by the log analysis system 200 of FIG. 2 or any combination of one or more of its components (e.g., the analysis module 210, the interface module 220).

At operation 1410, the log analysis system 200 may, for each log entry in the plurality of log entries, divide text of the log entry into a plurality of tokens using natural language processing. For example, the log analysis system 200 may extract the tokens from the log entries using the techniques discussed above with respect to FIG. 6. In some example embodiments, the plurality of tokens comprises an error field.

Next, at operation 1420, the log analysis system 200 may group the plurality of log entries based on their error fields. For example, the log analysis system 200 may divide the plurality of log entries into groups using the techniques discussed above with respect to FIG. 6.

The log analysis system 200 may then identify the set of unique words using a bag-of-words model on the error fields of the grouped plurality of log entries, at operation 1430.

It is contemplated that any of the other features described within the present disclosure can be incorporated into the method 1400.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: obtaining a log file comprising a plurality of log entries, each log entry in the plurality of log entries comprising a corresponding error message; identifying a set of unique words from the error messages of the plurality of log entries; for each error message in the error messages of the plurality of log entries, computing a corresponding term-frequency vector based on a corresponding frequency of occurrence for each unique word of the set of unique words in the error message; for each error message in the error messages of the plurality of log entries, computing a corresponding similarity measure between the term-frequency vectors of the error message and every other error message of the plurality of log entries; for each error message in the error messages of the plurality of log entries, computing a corresponding score based on a sum of the corresponding similarity measures between the term-frequency vectors of the error message and every other error message of the plurality of log entries; and displaying an indication of one or more of the error messages of the plurality of log entries on a computing device based on the corresponding scores for the one or more of the error messages of the plurality of log entries.

Example 2 includes the computer-implemented method of example 1, wherein the computer system comprises a client-side software tool running on the computing device.

Example 3 includes the computer-implemented method of example 1 or example 2, wherein the identifying the set of unique words from the error messages of the plurality of log entries comprises: for each log entry in the plurality of log entries, dividing text of the log entry into a plurality of tokens using natural language processing, the plurality of tokens comprising an error field; grouping the plurality of log entries based on their error fields; and identifying the set of unique words using a bag-of-words model on the error fields of the grouped plurality of log entries.

Example 4 includes the computer-implemented method of any one of examples 1 to 3, wherein identifying the set of unique words from the error messages of the plurality of log entries comprises selecting the plurality of log entries for use in the identifying the set of unique words based on a determination that each log entry in the plurality of log entries satisfies one or more filter criteria input by a user, the one or more filter criteria comprising: a user-specified component from which the corresponding error message of the log entry originated; a user-specified date range within which the log entry was recorded in the log file; a user-specified time range within which the log entry was recorded in the log file; one or more users-specified keywords included in the log entry; a user-specified severity level; a user-specified thread that was used to perform a task when the log entry was recorded in the log file; or a user-specified identification of another user included in the log entry.

Example 5 includes the computer-implemented method of any one of examples 1 to 4, wherein the displaying the indication of the one or more of the error messages of the plurality of log entries on the computing device comprises: ranking the error messages of the plurality of log entries based on their corresponding scores; and displaying the indication of the one or more of the error messages of the plurality of log entries based on the ranking.

Example 6 includes the computer-implemented method of any one of examples 1 to 5, further comprising: receiving, from the computing device, a user selection of a selectable user interface element displayed in association with the corresponding indication of one of the one or more of the error messages of the plurality of log entries; and in response to the receiving the user selection: modifying the plurality of log entries to exclude the log entry corresponding to the indication of the one of the one or more of the error messages for which the associated selectable user interface element was selected via the user selection; identifying another set of unique words from the error messages of the modified plurality of log entries; for each error message in the error messages of the modified plurality of log entries, computing another corresponding term-frequency vector based on another corresponding frequency of occurrence for each unique word of the other set of unique words in the error message; for each error message in the error messages of the modified plurality of log entries, computing another corresponding similarity measure between the error message and every other error message of the modified plurality of log entries; for each error message in the error messages of the modified plurality of log entries, computing another corresponding score based on another sum of the other corresponding similarity measures between the error message and every other error message of the modified plurality of log entries; and displaying another indication of one or more of the error messages of the modified plurality of log entries on the computing device based on the other corresponding scores for the one or more of the error messages of the modified plurality of log entries.

Example 7 includes the computer-implemented method of any one of examples 1 to 6, further comprising: receiving, from the computing device, a user selection of a selectable user interface element displayed in association with the corresponding indication of one of the one or more of the error messages of the plurality of log entries; and in response to the receiving the user selection, displaying log details of the log entry corresponding to the indication of the one of the one or more of the error messages for which the associated selectable user interface element was selected via the user selection.

Example 8 includes the computer-implemented method of any one of examples 1 to 7, further comprising: receiving, from the computing device, a user selection of a selectable user interface element displayed in association with the corresponding indication of one of the one or more of the error messages of the plurality of log entries; and in response to the receiving the user selection, displaying a stack trace of the log entry corresponding to the indication of the one of the one or more of the error messages for which the associated selectable user interface element was selected via the user selection.

Example 9 includes the computer-implemented method of any one of examples 1 to 8, further comprising displaying, on the computing device, a frequency distribution of the error messages of the plurality of log entries by date.

Example 10 includes the computer-implemented method of any one of examples 1 to 9, further comprising displaying, one the computing device, a distribution of the plurality of log entries by components present in the plurality of log files.

Example 11 includes the computer-implemented method of any one of examples 1 to 10, further comprising displaying, by the computing device, a distribution of the plurality of log entries by users present in the plurality of log files.

Example 12 includes a system comprising: at least one processor; and a non-transitory computer-readable medium storing executable instructions that, when executed, cause the at least one processor to perform the method of any one of examples 1 to 11.

Example 13 includes a non-transitory machine-readable storage medium, tangibly embodying a set of instructions that, when executed by at least one processor, causes the at least one processor to perform the method of any one of examples 1 to 11.

Example 14 includes a machine-readable medium carrying a set of instructions that, when executed by at least one processor, causes the at least one processor to carry out the method of any one of examples 1 to 11.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 15:
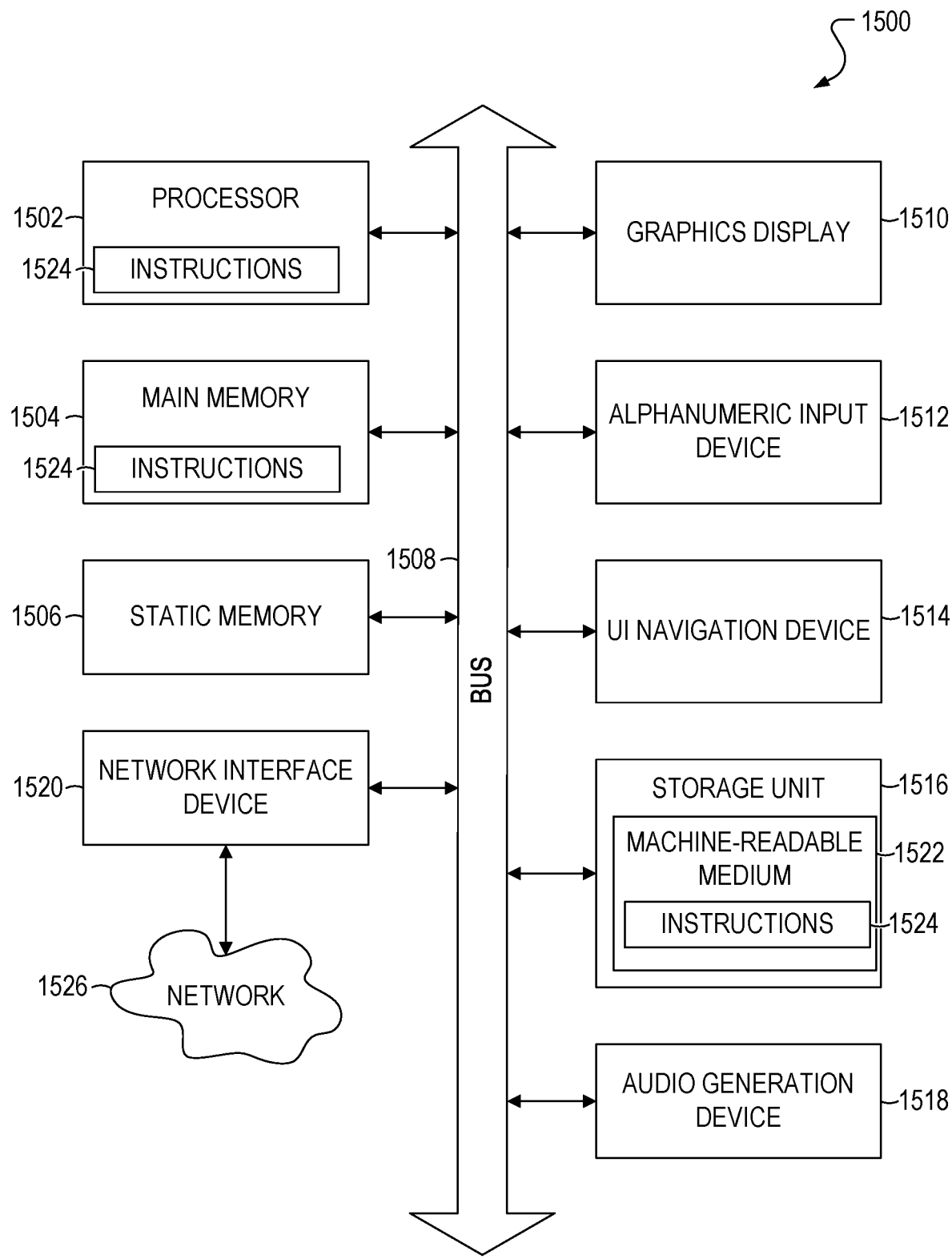
FIG. 15 is a block diagram of an example computer system on which methodologies described herein can be executed.

FIG. 15 is a block diagram of a machine in the example form of a computer system 1500 within which instructions 1524 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504, and a static memory 1506, which communicate with each other via a bus 1508. The computer system 1500 may further include a graphics or video display unit 1510 (e.g., a liquid crystal display (LCD) or a cathode ray tube (CRT)). The computer system 1500 also includes an alphanumeric input device 1512 (e.g., a keyboard), a user interface (UI) navigation (or cursor control) device 1514 (e.g., a mouse), a storage unit (e.g., a disk drive unit) 1516, an audio or signal generation device 1518 (e.g., a speaker), and a network interface device 1520.

The storage unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media. The instructions 1524 may also reside, completely or at least partially, within the static memory 1506.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:
    obtaining a log file comprising a plurality of log entries, each log entry in the plurality of log entries comprising a corresponding error message;
    identifying a set of unique words from the error messages of the plurality of log entries;
    for each error message in the error messages of the plurality of log entries, computing a corresponding term-frequency vector based on a corresponding frequency of occurrence for each unique word of the set of unique words in the error message;
    for each error message in the error messages of the plurality of log entries, computing a corresponding similarity measure between the term-frequency vectors of the error message and every other error message of the plurality of log entries;
    for each error message in the error messages of the plurality of log entries, computing a corresponding score based on a computation of a sum of the corresponding computed similarity measures between the computed term-frequency vectors of the error message and every other error message of the plurality of log entries; and
    displaying an indication of one or more of the error messages of the plurality of log entries on a computing device based on the corresponding scores for the one or more of the error messages of the plurality of log entries.

2. The computer-implemented method of claim 1, wherein the computer system comprises a client-side software tool running on the computing device.

3. The computer-implemented method of claim 1, wherein the identifying the set of unique words from the error messages of the plurality of log entries comprises:
    for each log entry in the plurality of log entries, dividing text of the log entry into a plurality of tokens using natural language processing, the plurality of tokens comprising an error field;
    grouping the plurality of log entries based on their error fields; and
    identifying the set of unique words using a bag-of-words model on the error fields of the grouped plurality of log entries.

4. The computer-implemented method of claim 1, wherein identifying the set of unique words from the error messages of the plurality of log entries comprises selecting the plurality of log entries for use in the identifying the set of unique words based on a determination that each log entry in the plurality of log entries satisfies one or more filter criteria input by a user, the one or more filter criteria comprising:
- a user-specified severity level;
- a user-specified thread that was used to perform a task when the log entry was recorded in the log file; or
- a user-specified identification of another user included in the log entry.

5. The computer-implemented method of claim 1, wherein the displaying the indication of the one or more of the error messages of the plurality of log entries on the computing device comprises:
- ranking the error messages of the plurality of log entries based on their corresponding scores; and
- displaying the indication of the one or more of the error messages of the plurality of log entries based on the ranking.

6. The computer-implemented method of claim 1, further comprising:
- receiving, from the computing device, a user selection of a selectable user interface element displayed in association with the corresponding indication of one of the one or more of the error messages of the plurality of log entries; and
- in response to the receiving the user selection:
- modifying the plurality of log entries to exclude the log entry corresponding to the indication of the one of the one or more of the error messages for which the associated selectable user interface element was selected via the user selection;
- identifying another set of unique words from the error messages of the modified plurality of log entries;
- for each error message in the error messages of the modified plurality of log entries, computing another corresponding term-frequency vector based on another corresponding frequency of occurrence for each unique word of the other set of unique words in the error message;
- for each error message in the error messages of the modified plurality of log entries, computing another corresponding similarity measure between the error message and every other error message of the modified plurality of log entries;
- for each error message in the error messages of the modified plurality of log entries, computing another corresponding score based on another sum of the other corresponding similarity measures between the error message and every other error message of the modified plurality of log entries; and
- displaying another indication of one or more of the error messages of the modified plurality of log entries on the computing device based on the other corresponding scores for the one or more of the error messages of the modified plurality of log entries.

7. The computer-implemented method of claim 1, further comprising:
- receiving, from the computing device, a user selection of a selectable user interface element displayed in association with the corresponding indication of one of the one or more of the error messages of the plurality of log entries; and
- in response to the receiving the user selection, displaying log details of the log entry corresponding to the indication of the one of the one or more of the error messages for which the associated selectable user interface element was selected via the user selection.

8. The computer-implemented method of claim 1, further comprising:
- receiving, from the computing device, a user selection of a selectable user interface element displayed in association with the corresponding indication of one of the one or more of the error messages of the plurality of log entries; and
- in response to the receiving the user selection, displaying a stack trace of the log entry corresponding to the indication of the one of the one or more of the error messages for which the associated selectable user interface element was selected via the user selection.

9. The computer-implemented method of claim 1, further comprising displaying, on the computing device, a frequency distribution of the error messages of the plurality of log entries by date.

10. The computer-implemented method of claim 1, further comprising displaying, one the computing device, a distribution of the plurality of log entries by components present in the plurality of log files.

11. The computer-implemented method of claim 1, further comprising displaying, by the computing device, a distribution of the plurality of log entries by users present in the plurality of log files.

12. A system of comprising:
- at least one hardware processor; and
- a non-transitory computer-readable medium storing executable instructions that, when executed, cause the at least one hardware processor to perform operations comprising:
  - obtaining a log file comprising a plurality of log entries, each log entry in the plurality of log entries comprising a corresponding error message;
  - identifying a set of unique words from the error messages of the plurality of log entries;
  - for each error message in the error messages of the plurality of log entries, computing a corresponding term-frequency vector based on a corresponding frequency of occurrence for each unique word of the set of unique words in the error message;
  - for each error message in the error messages of the plurality of log entries, computing a corresponding similarity measure between the term-frequency vectors of the error message and every other error message of the plurality of log entries;
  - for each error message in the error messages of the plurality of log entries, computing a corresponding score based on a computation of a sum of the corresponding computed similarity measures between the computed term-frequency vectors of the error message and every other error message of the plurality of log entries; and
  - displaying an indication of one or more of the error messages of the plurality of log entries on a computing device based on the corresponding scores for the one or more of the error messages of the plurality of log entries.

13. The system of claim 12, wherein the computer system comprises a client-side software tool running on the computing device.

14. The system of claim 12, wherein the identifying the set of unique words from the error messages of the plurality of log entries comprises:
- for each log entry in the plurality of log entries, dividing text of the log entry into a plurality of tokens using natural language processing, the plurality of tokens comprising an error field;

grouping the plurality of log entries based on their error fields; and identifying the set of unique words using a bag-of-words model on the error fields of the grouped plurality of log entries.

15. The system of claim 12, wherein identifying the set of unique words from the error messages of the plurality of log entries comprises selecting the plurality of log entries for use in the identifying the set of unique words based on a determination that each log entry in the plurality of log entries satisfies one or more filter criteria input by a user, the one or more filter criteria comprising:

a user-specified severity level;

a user-specified thread that was used to perform a task when the log entry was recorded in the log file; or a user-specified identification of another user included in the log entry.

16. The system of claim 12, wherein the displaying the indication of the one or more of the error messages of the plurality of log entries on the computing device comprises:

ranking the error messages of the plurality of log entries based on their corresponding scores; and displaying the indication of the one or more of the error messages of the plurality of log entries based on the ranking.

17. The system of claim 12, wherein the operations further comprise:

receiving, from the computing device, a user selection of a selectable user interface element displayed in association with the corresponding indication of one of the one or more of the error messages of the plurality of log entries; and in response to the receiving the user selection:

modifying the plurality of log entries to exclude the log entry corresponding to the indication of the one of the one or more of the error messages for which the associated selectable user interface element was selected via the user selection;

identifying another set of unique words from the error messages of the modified plurality of log entries;

for each error message in the error messages of the modified plurality of log entries, computing another corresponding term-frequency vector based on another corresponding frequency of occurrence for each unique word of the other set of unique words in the error message;

for each error message in the error messages of the modified plurality of log entries, computing another corresponding similarity measure between the term-frequency vectors of the error message and every other error message of the modified plurality of log entries;

for each error message in the error messages of the modified plurality of log entries, computing another corresponding score based on another sum of the other corresponding similarity measures between the term-frequency vectors of the error message and every other error message of the modified plurality of log entries; and displaying another indication of one or more of the error messages of the modified plurality of log entries on the computing device based on the other corresponding scores for the one or more of the error messages of the modified plurality of log entries.

18. The system of claim 12, wherein the operations further comprise:

receiving, from the computing device, a user selection of a selectable user interface element displayed in association with the corresponding indication of one of the one or more of the error messages of the plurality of log entries; and in response to the receiving the user selection, displaying log details of the log entry corresponding to the indication of the one of the one or more of the error messages for which the associated selectable user interface element was selected via the user selection.

19. The system of claim 12, wherein the operations further comprise:

receiving, from the computing device, a user selection of a selectable user interface element displayed in association with the corresponding indication of one of the one or more of the error messages of the plurality of log entries; and in response to the receiving the user selection, displaying a stack trace of the log entry corresponding to the indication of the one of the one or more of the error messages for which the associated selectable user interface element was selected via the user selection.

20. A non-transitory machine-readable storage medium tangibly embodying a set of instructions that, when executed by at least one hardware processor, causes the at least one processor to perform operations comprising:

obtaining a log file comprising a plurality of log entries, each log entry in the plurality of log entries comprising a corresponding error message;

identifying a set of unique words from the error messages of the plurality of log entries;

for each error message in the error messages of the plurality of log entries, computing a corresponding term-frequency vector based on a corresponding frequency of occurrence for each unique word of the set of unique words in the error message;

for each error message in the error messages of the plurality of log entries, computing a corresponding similarity measure between the error message and every other error message of the plurality of log entries;

for each error message in the error messages of the plurality of log entries, computing a corresponding score based on a computation of a sum of the corresponding computed similarity measures between the computed term-frequency vectors of the error message and every other error message of the plurality of log entries; and displaying an indication of one or more of the error messages of the plurality of log entries on a computing device based on the corresponding scores for the one or more of the error messages of the plurality of log entries.

* * * * *